Figure 1:
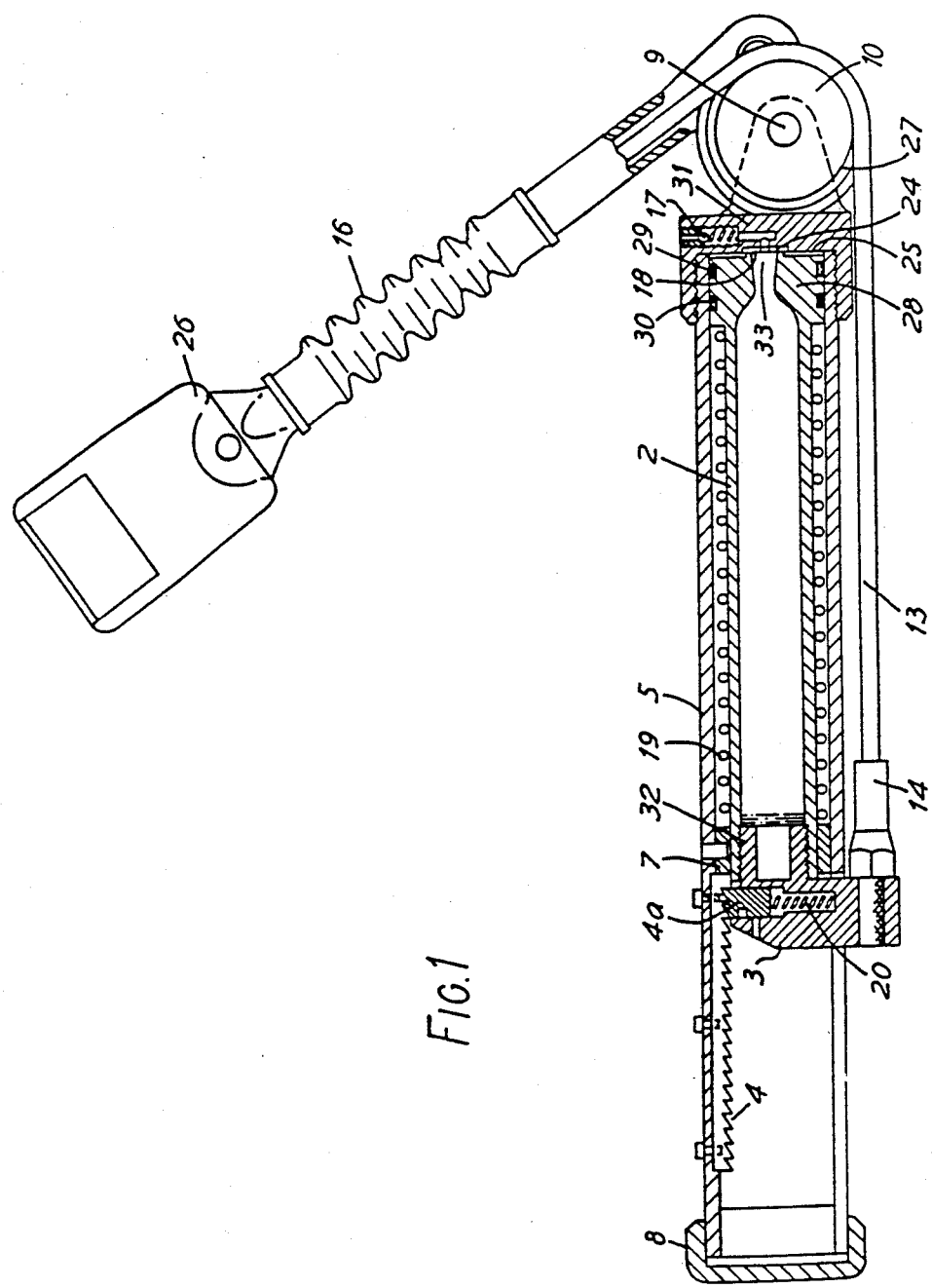

United States Patent [19]

Danicek et al.

[11] Patent Number: 4,917,210

[45] Date of Patent: Apr. 17, 1990

[54] TENSIONING DEVICE

[75] Inventors: Karel Danicek; Franz Hainz; Martin Specht, all of Munich; Rudolf Meyer, Odelzhausen, all of Fed. Rep. of Germany

[73] Assignee: BSRD Limited, Carlisle, Great Britain

[21] Appl. No.: 241,537

[22] Filed: Sep. 2, 1988

[30] Foreign Application Priority Data

Sep. 3, 1987 [DE] Fed. Rep. of Germany ....... 3729505

[51] Int. Cl.$^4$ ............................................. B60R 22/46
[52] U.S. Cl. ..................................... 180/268; 280/806
[58] Field of Search ......................... 280/806; 180/268

[56] References Cited

U.S. PATENT DOCUMENTS

| | | | |
|---|---|---|---|
| 3,871,470 | 3/1975 | Schwanz et al. | 280/806 |
| 4,008,780 | 2/1977 | Bendler et al. | 280/806 |
| 4,232,886 | 11/1980 | Tsuge et al. | 280/806 |
| 4,427,216 | 1/1984 | Kato et al. | 280/806 |
| 4,705,296 | 11/1987 | Andersson et al. | 280/806 |

FOREIGN PATENT DOCUMENTS

| | | |
|---|---|---|
| 2505625 | 2/1975 | Fed. Rep. of Germany . |
| 2726096 | 6/1977 | Fed. Rep. of Germany . |
| 3327970 | 2/1985 | Fed. Rep. of Germany . |
| 8502536 | 7/1986 | Fed. Rep. of Germany . |
| 3635022 | 4/1987 | Fed. Rep. of Germany . |
| 2444473 | 12/1978 | France . |

Primary Examiner—Kenneth R. Rice
Attorney, Agent, or Firm—Markell Seitzman

[57] ABSTRACT

A device for the tensioning of a safety belt of a vehicle, for eliminating belt slack, in the event of an accident has a sensor (2, 28, 29, 30) which acts in the event of an extreme change in speed (shock load) by virtue of its inert mass, and a traction cable connected to the safety belt, cable being actuated by gas pressure released from a gas reservoir (2), gas reservoir forming part of said inertial mass.

12 Claims, 4 Drawing Sheets

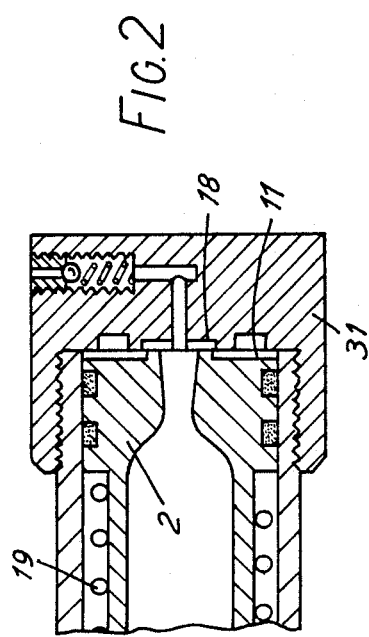
F1G.2
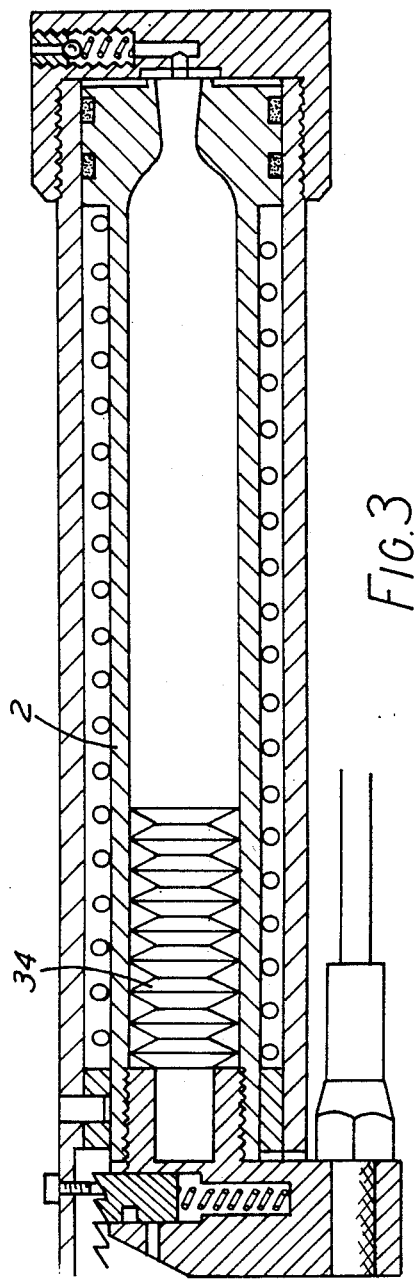
F1G.3

TENSIONING DEVICE

This invention relates to a tensioning device and relates more especially but not exclusively to a device for the tensioning of a passenger safety belt of a motor vehicle.

Safety belt tensioning devices have already been proposed for example in the Specification of French Patent Specification No. 2444 473. Such a device operates in the event of an excessive rate of change of vehicle speed to ensure that a fastened but otherwise loosely fitted seatbelt is drawn tightly to the body of an occupant. The device therefore has the object of preventing an occupant of a seat being projected forward out of the seat by an abrupt change of speed such as may occur in an accident.

This above previous proposal works by means of a piston which is displaced in a cylinder to tighten the seat belt when compressed gas is released by a sensor device. Other devices with a similar object have been proposed in German OLS No. 25 05625 and German OLS No. 2726 096. All these devices tend to be somewhat complex and expensive to produce and it is an object of the present invention to provide a simpler and less bulky tensioning device which is particularly applicable to use with vehicle passenger safety belts.

According to the present invention there is provided a tensioning device comprising a housing and a tensioning member movably carried by the housing for connection to means to be tensioned said tensioning member being part of fluid pressure responsive means and the device including speed change response means having an inertial mass responsive to a predetermined inertial impulse or rate of change of speed of the housing to apply gas under pressure from a reservoir to said pressure responsive means in a sense to move the tensioning member in a direction away from an initial position to cause tensioning movement thereof and characterised by said reservoir forming part of the said inertial mass.

Thus in accordance with an example of the invention a reservoir in which the fluid pressure gas is stored, has not only the storage function but also provides sensor mass which reacts in the event of an extreme change of speed as experienced in a crash, so that a valve is opened and gas pressure is released from the reservoir to act upon a working surface provided of the gas reservoir. The gas reservoir is thus moved in the sense of eliminating belt slack. As a third function the reservoir therefore acts as a working piston. In the line of movement along which the gas reservoir travels after the release, provision can be made for a pawl and ratchet arrangement by which the gas reservoir, when moved out of its normal position, is prevented from returning and continues to be tight.

In order that the invention may be more clearly understood and readily carried into effect, the same will be further described by way of example with reference to the accompanying drawings of which FIG. 1 illustrates a vehicle seat belt tensioner in accordance with one embodiment FIGS. 2 and 3 illustrate on a larger scale additional optional features.

Figure 4:
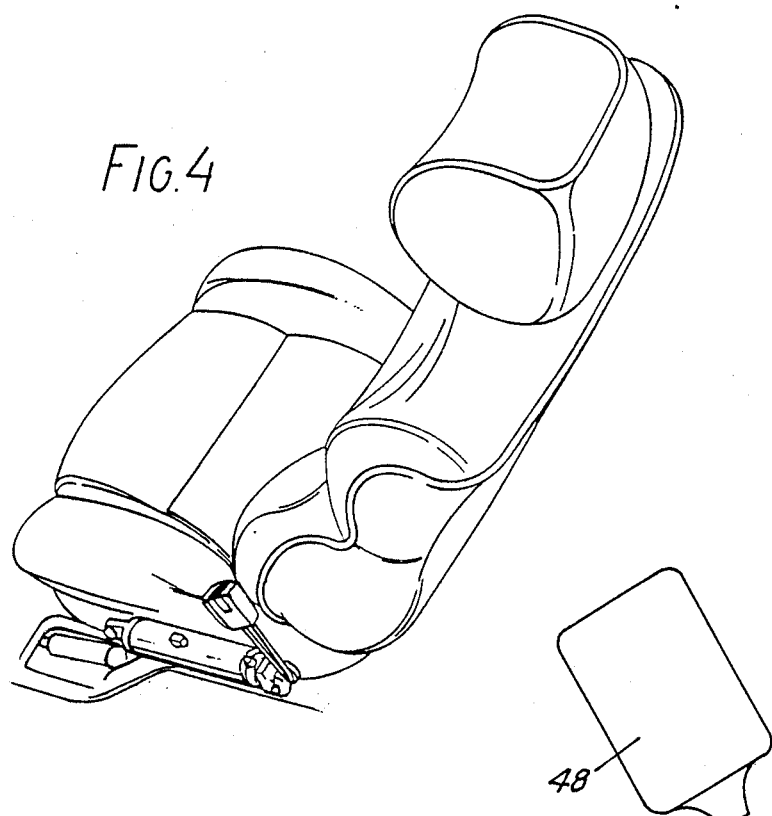
Figure 5:
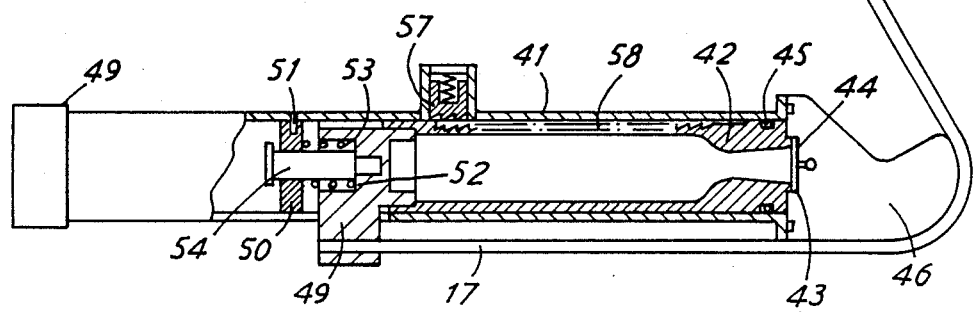
Figure 6:
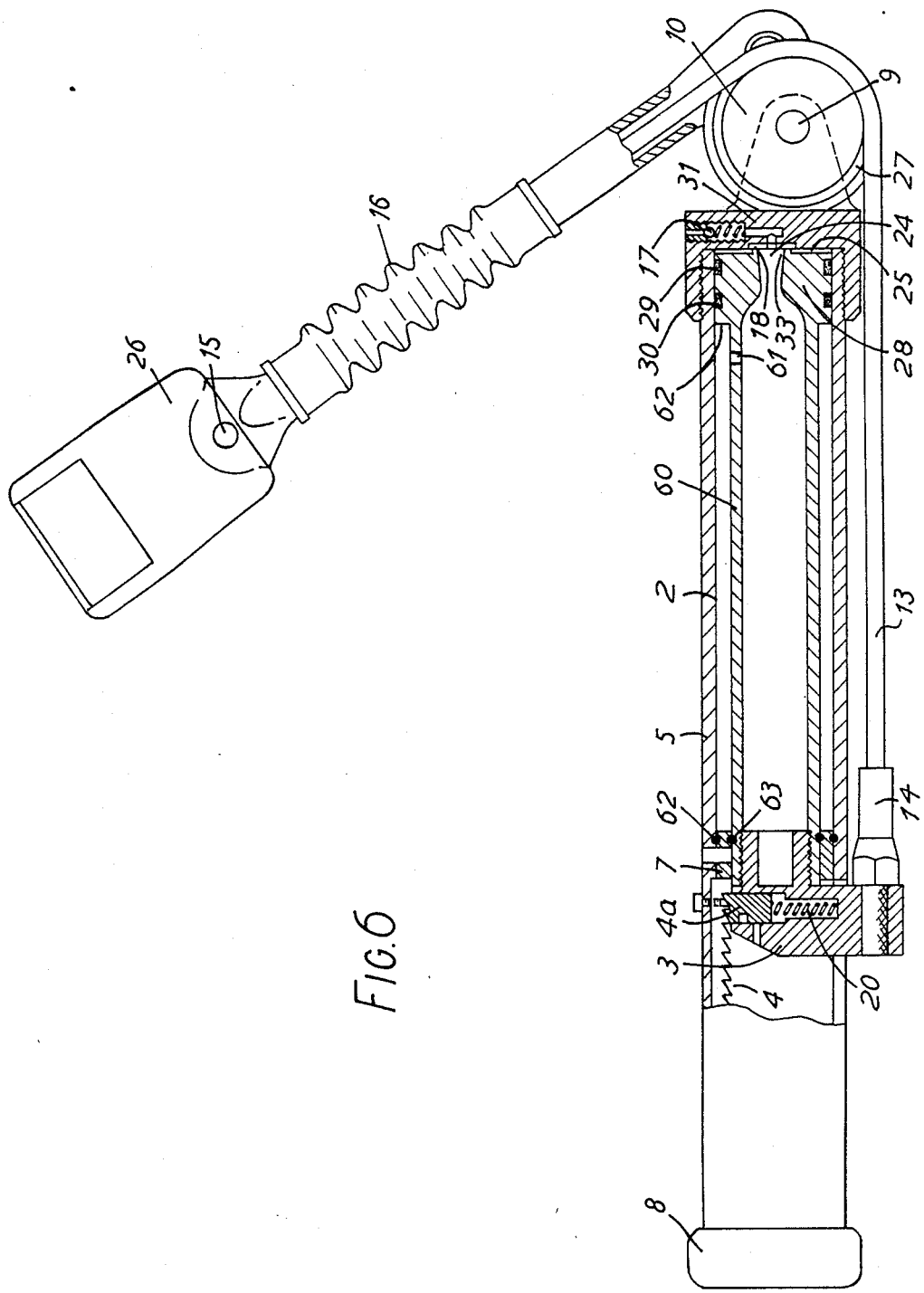

FIG. 4 illustrates a passenger seat with a belt tensioning device attached to the rail thereof and FIGS. 5 and 6 illustrate further alternative embodiments of the invention.

Referring to FIG. 1, a housing comprises a working cylinder 5, extending with its axis lying along the vehicle's normal direction of movement. Coaxially arranged so as to sealingly slide therein, is a gas reservoir 2 for compressed air. The gas reservoir 2 is, for this purpose, carried at one end by a fixed guide ring 7 and at the other end widened to form a piston 28 with circumferential grooves in which are inserted piston sealing rings 29 and 30. Piston 28 therefore sealingly slides on the inner wall of the cylinder 5.

The piston member 28 contains an outlet orifice 24, in the form of a DeLaval nozzle opened into the outer front face of the piston. In the opposite inner frontface surface of the cylinder 5 a sealing disc 18 is located by which, in the rest position illustrated, the outlet orifice 24 and hence the inside of the gas reservoir 2 is sealed off. Disc 18 is carried within a screwed on vented closure cap 31 on the right hand end of the housing 5.

A helical spring 19 captive between 7 and 28 urges the gas reservoir 2 against the inside surface of the cap 31 so that an annular surface 33 around the orifice 24 of the nozzle is pressed sealingly against the sealing disc 18.

A spring-loaded non-return valve 17 is provided in a passage channel 27 which also extends through the middle portion of the sealing disc 18. This valve 17 can be used for topping up pressure in the gas reservoir 2.

The left hand end of the cylindrical gas reservoir 2 is sealed by a combined closure and tension block 3, with a threaded portion 32 screwed into a female thread at the end of the gas reservoir 2. The tension block 3 carries a spring loaded pawl 4a which engages a rack 4 extending in the gas reservoir's 2 direction of movement. It is fastened with screws within the left hand end of the housing 5 which is conveniently closed off with a cap 8.

One end of a tension cable 13, which may consist of a braided steel is attached via a fastening 14 to a lateral projection of the tension block 3 which extends laterally out of body 5 as shown. The tension cable 13 extends in a longitudinal direction under 5 and is then conveyed around a guide roller 10 and carried in a protective sleeve 35 and a bellows 16 to be connected to the frame member of a seat belt buckle 26 via a rivet 15. The roller 10 is conveniently carried on supporting projection 6 of the right hand cap 6 of the housing 5. The projection 6, the pin 9 and the guide roller 10 can conveniently be concealed with a suitable cover, which is not shown.

In operation of the tensioning device of FIG. 1, the gas reservoir 2 is normally urged to the right as shown in the drawing by the force of the spring 19. The force of the spring is sufficient to easily overcome the force exerted by the gas pressure acting on the area of disc 18 defined by annular surface 33. When an extreme vehicle deceleration occurs, for example, in an accident involving a collision, the gas reservoir 2 forms part of a speed change responsive means in that as a result of its inertial mass, it moves to the left in housing 5 against the force of the spring 19. As soon as the gas reservoir has executed a movement of approx 1 to 2 mm, the stored-up pressure medium is released to act upon the full working surface 25 of the piston member 28. The action of the gas pressure gas upon the piston is thus increased by about ten times and drives the piston 28 to the left rapidly and takes the traction cable 13 with it. The action of the ratchet device which is formed by the pawl 4a and and the rack 4, has the effect of keeping the safety belt taut, thus ensuring, possibly in conjunction with a retractor, that the chest initial displacement can be limited to approx 150 mm. in the modified form of construction represented in FIG. 2, an annular magnet 11 has been added to the cap 31 which with the piston 28 being formed of magnetic material acts upon the spring 19 piston 28 in the normal sealing position shown. This annular magnet 11 is placed around the sealing disc 18.

In the form of construction represented in FIG. 3, the compensation medium in the interior of the gas reservoir 2 is provided in the form of a metal bellows 34. This metal bellows 34 is characterized by the fact that it reduces its volume when the temperature rises, thus ensuring that the gas in the gas reservoir 2 has more or less constant gas pressure even with a rise in temperature. In the form of construction represented, the metal bellows 34 is located within the left hand end of the gas reservoir's interior opposite the outlet orifice 24. The inside of the metal bellows 34 is gas-tight in relation to the gas in the gas reservoir 2, thus supplying the desired compensation effect. Nitinol is an example of a suitable metal for the bellows 34, having a Ti-Ni alloy with approx 55% nickel.

It will be appreciated that in the device described the bias force of the spring and the magnetic means if included is such as to maintain the closed condition of the valve. Moreover, the shape of the aperture at 33 being such as to provide a so-called "DeLaval" nozzle with convergent-divergent diameters enhances the flow characteristics. The ratio of the areas of the pressure responsive surfaces of the member 2 which are subject to reservoir pressure in the normal and released conditions is typically 1:10. This and the other dimensions can be such as to enable 1 to 2 mm initial movement of the reservoir to initiate 160 mm of belt take up within 22 to 28 milliseconds of an excessive rate of change of vehicle speed beginning to occur.

The mass of the reservoir is preferably arranged to move in the normal direction of travel of the vehicle. It is preferable for the buckle, which is connected to the tension cable, to be arranged to move in a suitable member with a gaiter 16. To achieve this the guide member can be arranged geometrically on the rail of the vehicle seat as shown in FIG. 4 in such a way as to allow for the ergonomic flow of the safety belt.

Even with a typically most unfavourable response time of (say) 15 milliseconds, the safety belt buckle is drawn back 80 mm. A belt slack of not more than 160 mm can thus be drawn off early enough (e.g. 27 ms) in combination with the tightening device of the invention to enable the initial chest displacement to be limited to approx. 150 mm.

In a further alternative form of tensioning device in accordance with the invention the comparatively long spring 19 of FIG. 1 may be dispensed with. Thus referring now to FIG. 5, which is also on a reduced scale, a housing 41 again comprises a working cylinder within which a tubular piston 42 formed of a compressed gas reservoir is sealingly slideable. In the position shown the right hand end has its annular sealing part 43 in engagement with an annular seal member 44 carried in the end closure member 45 formed integrally with a guide surface 46 for the tension cable 47 connected to the seat belt buckle 48.

Located within the cylindrical housing 41, to the left of the other end closure member 49, a stop member 50 is located in the housing by means of a shear-pin 51. The piston 42 is urged into engagement with the seal member 44 by virtue of a short compression spring 53 located between the stop member 50 and a recess 52 of the closure member 49 by means of a guide screw 54. The left hand end of the cylindrical housing is closed by a cap 55 and as in the case of FIG. 1, a lateral projection 56 of member 49 is connected to the cable 47 as indicated. A spring-loaded pawl 57 is provided in the housing, which engages with ratchet teeth 58, these teeth now being formed in the outer surface of the piston 42, when the piston moves from the unoperated position shown.

In operation of the device illustrated in FIG. 5, the ratchet pawl 57 is shown disengaged from the teeth 58 and the force of spring 58 is such as to hold the piston 42 in engagement with seal 44 against the pressure of the compressed gas within the reservoir volume of 42. In the event of a predetermined impulsive change of speed component in the direction of the cylinder axis, the inertial mass of the piston 42 moves in the housing against the spring 53 thereby communicating the container gas pressure to the full area of the end of piston 42. The piston is thereby driven with the assistance of the pressure against the stop number 50 with sufficient force to sheer the pin 51 and allow the piston to then freely tension the cable under the influence of the gas pressure. The pawl 54 then engages the ratchet 55 in the position taken up by the piston and serves to retain the seat belt firmly against the body of the occupant of the seat.

Yet another modification of the tensioning device of FIG. 1, is shown in FIG. 6 wherein the long spring 19 of FIG. 1 is again dispensed with. The guide member 7 is now provided with seals such that the region 60 between the housing and the moveable piston is sealed from atmosphere. A small aperture 61 is provided whereby the interior of the piston is connected with the region 60 and 60 can thus be equalised in pressure with the stored reservoir pressure. By such means the reservoir is thereby urged by the resultant pressure, acting on the annular area 62, against the seal 18 as before.

In operation, an impulsive change of speed in the direction of the housing axis will cause the inertial mass of the piston to lift away from seal 18 as before and the stored pressure will be communicated to the whole area 25 of the end of the piston as before to drive the piston in a direction to tighten the scat belt.

In this last arrangement it may be arranged that the aforementioned seals 62, 63 in the guide member 7 shall cease to be effective after the piston has moved a predetermined distance (say 5 mm) from the position shown. With the aperture 61 being chosen to be sufficiently small the effect is such as to quickly remove the bias force provided by the compressed gas in region 60 and thereby enhance the tightening force exerted by the compressed gas acting over the whole area 25 of the piston 28.

Although now shown in the drawings, it may preferably be arranged to include a calibration valve in the closure member 31 or 46 whereby routine during servicing of the vehicle the stored pressure can be restored to not more than a predetermined pressure. Such calibration valve can be a simple pressure relief valve.

We claim:
1. A tensioning device comprising a fixed housing and a tensioning member moveably carried by the housing for connection to first means to be tensioned, said tensioning member being part of fluid pressure responsible means and the device including speed change responsive means response to a predetermined rate of change of speed of the housing to apply gas under pressure from a reservoir to said pressure reservoir means in a sense to move the tensioning member in a direction aware from an initial position to cause tensioning movement therefore, wherein said reservoir forming part of said speed change responsive means.

2. A tensioning device as claimed in claim 1 wherein in said initial position said fluid pressure responsive means holds closed a valve preventing the fluid pressure being applied thereto.

3. A tensioning device as claimed in claim 2 wherein said valve comprises an annular sealing surface of said fluid pressure responsive means sealing engageable with an annular surface of the housing.

4. A tensioning device as claimed in claim 3 wherein said housing includes a passage through said valve means for recharging said reservoir with fluid pressure.

5. A tensioning device as claimed in claim 1, 2, 3 or 4 wherein biassing means biasses said fluid pressure responsive means towards said initial position.

6. A tensioning device as claimed in claim 5 wherein said biassing means comprises a coil spring.

7. A tensioning device as claimed in claim 5 wherein said biassed means comprises a fluid pressure responsive area of said pressure responsive means.

8. A tensioning device as claimed in claim 6 wherein said coil spring is located under compression between said fluid pressure responsive member and a stop located in the housing, said stop being located by means which permit release of said stop by impact of the pressure responsive means.

9. A tensioning device as claimed in claim 5 wherein said biassing means comprises magnetic means 11.

10. A tensioning device as claimed in claim 1 wherein a pawl and ratchet is provided to prevent movement in an opposite direction.

11. A tensioning device as claimed in claim 10 wherein said reservoir includes compensation means for reducing the effects of temperature changes on the contained fluid pressure.

12. A tensioning device as claimed in claim 11 wherein said compensation means comprising a bellows.

* * * * *